Figure 1:
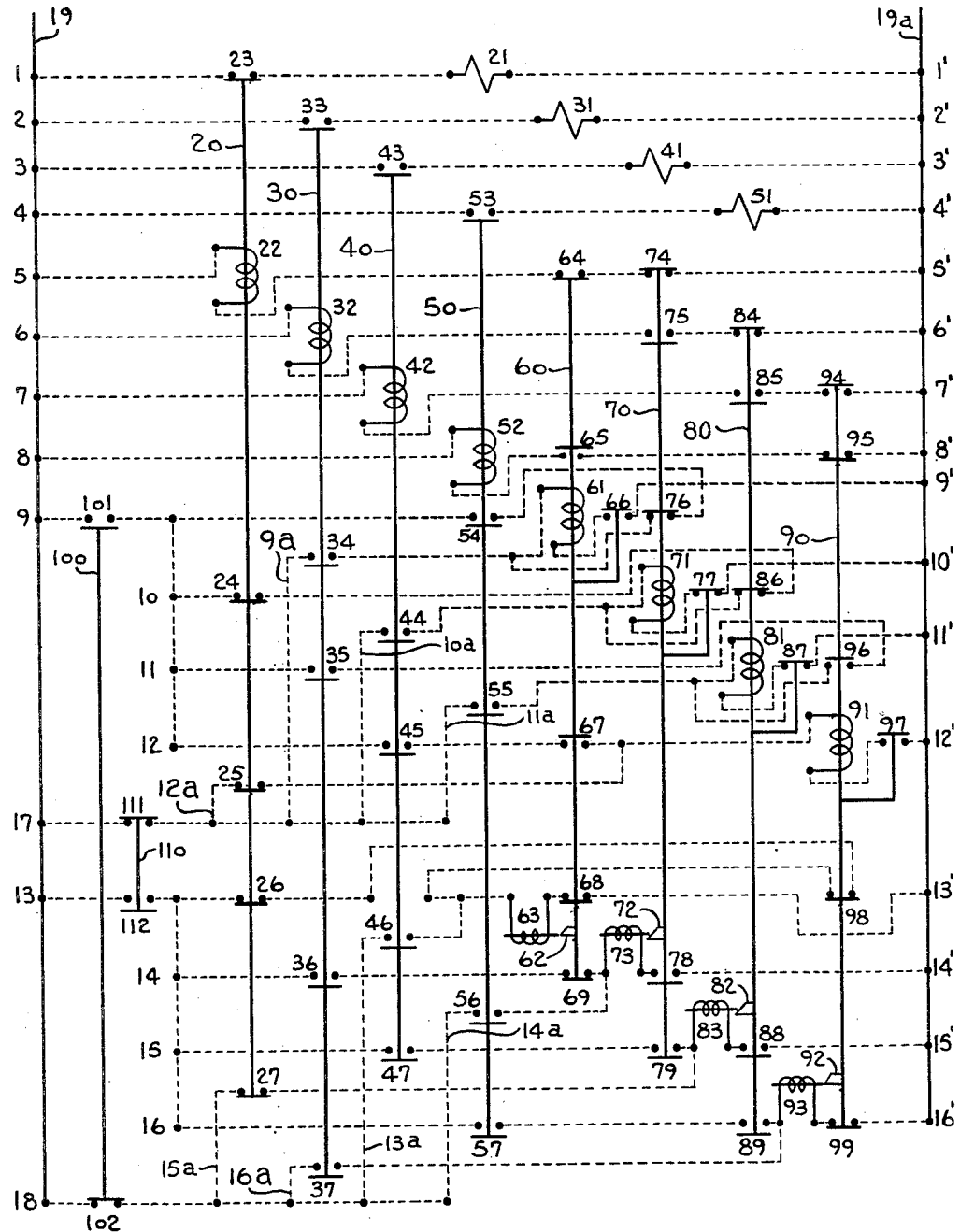

April 7, 1953　　　　　　R. N. ECK　　　　　　2,634,376
ELECTRICAL STEPPING CONTROL SYSTEM
Filed Sept. 22, 1951　　　　　　　　　　　2 SHEETS—SHEET 1

*INVENTOR.*
ROBERT N. ECK
BY
W. E. Lyon
ATTORNEY

Patented Apr. 7, 1953

2,634,376

UNITED STATES PATENT OFFICE 2,634,376

ELECTRICAL STEPPING CONTROL SYSTEM

Robert Nelson Eck, Whitefish Bay, Wis., assignor to Cutler-Hammer, Inc., Milwaukee, Wis., a corporation of Delaware Application September 22, 1951, Serial No. 247,850

12 Claims. (Cl. 307—41)

1

This invention relates to improvements in electrical control systems, particularly to control systems in which a plurality of separate electrical loads may be individually energized in a definite order of progression forward or backward.

In some machine cycles it is necessary to control several solenoids or other work-producing elements in a definite order progressing step-by-step forwardly or step-by-step backwardly in the cycle. Heretofore such stepping control has been accomplished by specially designed relays which are expensive and require special precaution in their use.

It is an object of this invention, therefore, to provide an electrical control system in which the sequential energization of individual circuits is effected both in forward and rearward stepping cycles.

It is a further object of this invention to provide such an electrical control system which utilizes only standard relays of the latch and non-latching type.

These objects are obtained by controlling the contacts in the ultimate work-producing circuits by standard non-latching relays and controlling contacts in the circuits for the non-latching relays by standard latching relays. Other contacts operated by the non-latching relays control the circuits for the proper latching relays so that upon closing of the latching relay circuits by a first or forward stepping limit switch the next forward stepping non-latching relay circuit is energized. The circuits for the unlatching coils of the latching relays are controlled by contacts operated by both the latching and the non-latching relays so that upon closing of the circuits for the unlatching coils by a second or reverse stepping limit switch the proper latched relay will open to close the circuit for the next rearwardly stepping non-latching relay. The forward stepping limit switch also controls circuits which include the unlatching coils and the backward stepping limit switch also controls circuits which include the latching relays. By such secondary circuits, the circuits which are to be closed and/or opened upon the next operation of the limit switches are placed in proper condition by the release of the limit switches. With this arrangement, by operating the first limit switch the next forward circuit is energized. Each time such limit switch is closed and opened the cycle steps forward. Each time the second limit switch is momentarily closed and opened the cycle steps rearwardly.

Figure 2:
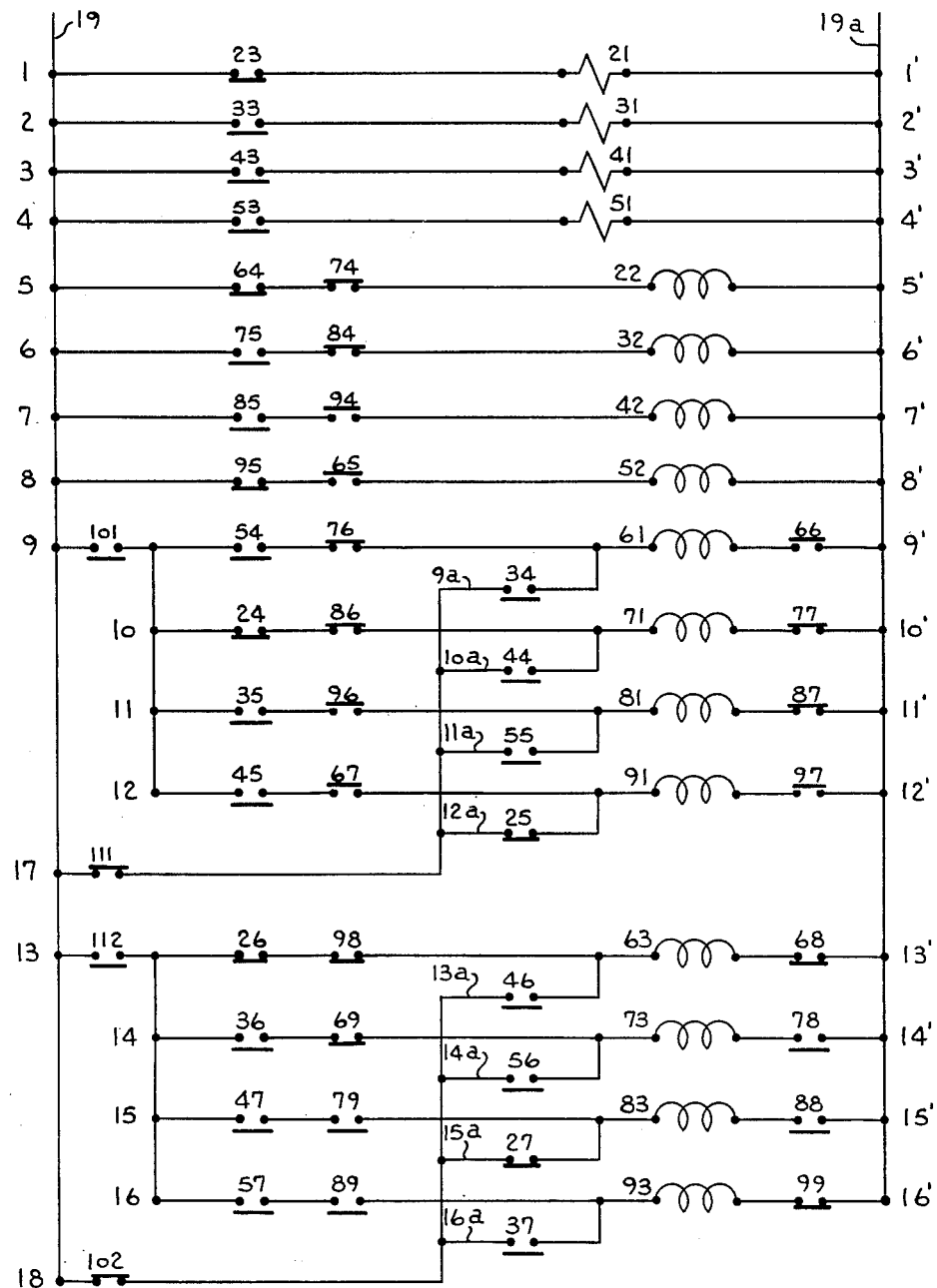

The novel features which are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawing in which:

Fig. 1 is a chart showing in vertical alinement the relays and the contacts operated by the respective relays. Each individual circuit is shown in broken line; and Fig. 2 is a line diagram of one form of the electrical control system embodying the present invention. By horizontally alining the diagram of Fig. 2 and the chart of Fig. 1 the chart acts as an index to locate on Fig. 2 the contacts operated by each relay.

In order to simplify understanding of the chart and diagram, each relay, its winding or windings, the contacts operated by it, and the work-producing solenoids controlled thereby are designated by two digit reference numerals the first digit of which is the same.

Power for the operation of work-performing solenoids 21, 31, 41, and 51 and the relays of the control system is supplied by the vertical power lines 19 and 19a connected to a suitable source of power. Such work-producing solenoids are of any well-known design adapted for the function desired and are connected across the lines 19 and 19a by horizontal circuits 1—1', 2—2', 3—3', 4—4'. Such circuits include contacts 23, 33, 43, and 53 operated by non-latching relays 20, 30, 40, and 50 (see Fig. 1) of standard design. The windings 22, 32, 42, and 52 of such relays are included in horizontal circuits 5—5', 6—6', 7—7', and 8—8'. These circuits in the order named contain, in pairs, contacts 64—74, 75—84, 85—94, and 95—65 operated by latching relays 60, 70, 80, and 90.

The latching relays 60, 70, 80, and 90 are of standard design and have closing or latching windings 61, 71, 81, and 91 included in the order named in the horizontal circuits 9—9', 10—10', 11—11', and 12—12'. These circuits also contain in order named: contacts 54, 24, 35, and 45 controlled by the non-latching relays 50, 20, 30, and 40, respectively; contacts 76, 86, 96, and 67 controlled by latching relays 70, 80, 90, and 60, respectively; and contacts 66, 77, 87, and 97 controlled by the latching relays 60, 70, 80, and 90 in such order. The last named contacts break the horizontal circuits in which they are located just as the corresponding latching relays associated therewith are mechanically latched. All of the horizontal circuits 9—9', 10—10', 11—11', and 12—12' are connected across the line by the closing of the normally open contacts 101 of a forwardly stepping limit switch 100.

The mechanical latches for the latching relays 60, 70, 80, and 90 are schematically indicated at 62, 72, 82, and 92 (Fig. 1). When a latching relay winding is momentarily energized, such relay is mechanically locked in "On" position and so held until released by energization of its unlatching coil. The unlatching coils 63, 73, 83, 93 of the latching relays are included in horizontal circuits 13—13', 14—14', 15—15', and 16—16'. These circuits also contain in the order named: contacts 26, 36, 47, and 57 operated by the non-latching relays 20, 30, 40, and 50; contacts 98, 69, 79, and 89 operated by latching relays 90, 60, 70, and 80; and contacts 68, 78, 88, and 99 also controlled by latching relays 60, 70, 80, and 90. The last named contacts are closed when the latching relays are mechanically latched to partially complete the circuits to the unlatching coils. All of the horizontal circuits 13—13', 14—14', 15—15', and 16—16' are connected across the line by the closing of the normally open contacts 112 of a backwardly stepping limit switch 110.

The closing or latching windings 61, 71, 81, and 91 are also connected across the line by secondary circuits 17—9a—9', 17—10a—10', 17—11a—11', and 17—12a—12' containing, in the order named, contacts 34, 44, 55, and 25 controlled by the non-latching relays. All of these horizontal circuits are connected across the line by the normally closed contacts 111 of backwardly stepping limit switch 110. When the backwardly stepping limit switch 110 is closed, its contacts 112 are closed and its contacts 111 are opened; and upon release of switch 110, said contacts return to their normal positions.

The unlatching coils 63, 73, 83, and 93 are also connectible across the line by secondary circuits 18—13a—13', 18—14a—14', 18—15a—15', and 18—16a—16' containing, in the order named, contacts 46, 56, 27, and 37 controlled by the non-latching relays. All of these horizontal circuits are connected across the line by the normally closed contacts 102 of forwardly stepping limit switch 100. When the forwardly stepping limit switch 100 is closed, its contacts 101 are closed and its contacts 102 are opened; and upon release of switch 100, said contacts return to their normal positions.

From an understanding of the functions of the above-described latching relays, it will become apparent to one skilled in the art that such functions can be accomplished by any one of a number of standard electroresponsive switches. For example, any switch having individual windings for opening and closing its contacts, said contacts when not subject to the influence of either of said windings being adapted to remain (by latches or other means) in the positions to which they were last moved, will serve the desired purpose.

In the figures the relays are all shown in an initial position with their contacts shown open or closed as the case may be when in such initial position.

The system shown in the drawings is a closed loop. In operation the cycle of energization goes from solenoid 21 to solenoid 31, thence to solenoid 41, then to solenoid 51, and then back to solenoid 21. For a starting point in describing the operation of the system solenoid 21 is energized and relays 20, 60, and 90 are closed as shown in the drawings. The next momentary closing of limit switch 100 closes contacts 101 and energizes the horizontal circuit 10—10' causing latching relay 70 to latch closed. This opens the circuit 5—5' deenergizing relay 20 and closes the circuit 6—6' energizing relay 30. Upon opening the limit switch 110 contacts 102 close the circuit 18—16a—16' unlatching relay 90 and setting up horizontal circuit 7—7' for the next forward closing. This completes the first forward stepping cycle energizing solenoid 31 deenergizing solenoid 21.

If limit switch 100 is again closed the circuit 11—11' will be energized and relay 80 closed. The effect of this is to open the circuit 6—6' releasing relay 30 and to close the circuit 7—7' energizing relay 40. As the limit switch 100 is released, the circuit 18—13a—13' will be closed to energize winding 63 and unlatch relay 60. In this condition relays 40, 70, and 80 are closed and the solenoid 41 is across the line. This completes the second forward stepping cycle.

Assume while in the last position it is desirable to take a backward step. To do this the backward stepping or second limit switch 110 is moved from its normal position to its closed position. This closes contacts 112 and places the circuit 15—15' across the line energizing winding 83 and unlatching relay 80. The unlatching of relay 80 energizes circuit 6—6' closing relay 30 to place solenoid 31 across the line. As the limit switch 110 is released to its normal position, contacts 111 energize circuit 17—9a—9' energizing winding 61 and closing relay 60. The relays 30, 60, and 70 are then all closed and solenoid 31 energized. This completes a backward stepping cycle. If the limit switch 110 were again opened and closed, the relays 20, 60, and 90 would become closed and the system would be in its initial starting position with the solenoid 21 energized.

Assume that the system is in the third position with solenoid 41 energized and relays 40, 70 and 80 closed, the next closing and opening of the forward stepping limit switch 100 will cause relays 50, 80, and 90 to become closed and relays 40 and 70 to open. In this fourth position the solenoid 51 is energized. Because of the closed loop arrangement the next opening and closing of the limit switch 100 will step the cycle to its initial position with solenoid 21 energized and relays 20, 60, and 90 closed.

The essence of this arrangement as it pertains to forward stepping is the energizing of a new additional latching relay and then the unlatching of one of the previous latched relays each time the limit switch 100 is closed and opened. The bringing in of the new latching relay and the unlatching of one of the old latched relays sets the circuits for the next actuation of either limit switch. As it pertains to backward stepping, the essence of this arrangement is the unlatching of one of the latched relays and then the latching of a new latching relay each time the limit switch 110 is closed and opened.

The arrangement shown may by a simple modification be converted from closed loop to straight line operation. In other words, the forward stepping will stop when solenoid 51 is energized. To thereafter energize solenoid 21, the backward stepping limit switch 110 would have to be used to step-by-step bring the system to the starting position. This simple modification consists of eliminating contacts 54 and 76 permanently breaking the horizontal circuit 9—9' and eliminating contacts 26 and 98 permanently breaking the horizontal circuit 13—13'. In the fourth position, as previously explained, solenoid 51 is energized and relays 50, 80, and 90 closed. With circuit 9—9' completely broken the latching relay 60 can not be closed even though forward stepping limit switch 100 be closed. However, if backward stepping limit switch 110 be closed, latching relay 90 will be unlatched to break the circuit 8—8' and open relays 50 and close the circuit 7—7' to close relay 40. Continued operation of backward stepping limit switch 110 will bring the circuit to its initial position with solenoid 21 energized and relays 20, 60, and 90 closed. If in this position the backward stepping limit switch 110 is again closed nothing will happen because circuit 13—13' is permanently broken. However if the forward stepping limit switch 100 is closed the cycle will again move forward to energize solenoid 31 as previously described.

The following table shows the solenoids and non-latching relays energized and the latching relays closed for each full position and each intermediate position in the forward and backward stepping cycles. The intermediate positions forward are designated by the addition of the letter *a* and the intermediate positions backward by the letter *b* added to the position number.

FORWARD STEPPING

| Position | Solenoid | Non-latching Relays | Latching Relays |
| --- | --- | --- | --- |
| 1 | 21 | 20 | 60—90 |
| 1a | 31 | 30 | 60—70—90 |
| 2 | 31 | 30 | 60—70 |
| 2a | 41 | 40 | 60—70—80 |
| 3 | 41 | 40 | 70—80 |
| 3a | 51 | 50 | 70—80—90 |
| 4 | 51 | 50 | 80—90 |
| 4a | 21 | 20 | 60—80—90 |
| 1 | 21 | 20 | 60—90 |

BACKWARD STEPPING

| Position | Solenoid | Non-latching Relays | Latching Relays |
| --- | --- | --- | --- |
| 1 | 21 | 20 | 60—90 |
| 1b | 51 | 50 | 90 |
| 4 | 51 | 50 | 80—90 |
| 4b | 41 | 40 | 80 |
| 3 | 41 | 40 | 70—80 |
| 3b | 31 | 30 | 70 |
| 2 | 31 | 30 | 60—70 |
| 2b | 21 | 20 | 60 |
| 1 | 21 | 20 | 60—90 |

There are other combinations of this fundamental system which can be made by simple adjustments. For example, if it is desired to keep either the closed loop or straight line stepping operations and have a stepping to effect a return to a pre-selected starting point, solenoid 21 for example, it is only necessary to: interpose between line 19 and the left hand side of winding 61 (Fig. 2), one of the normally open contacts of a momentary closed reset button and interpose between line 19 and the left hand side of winding 73 (Fig. 2) a similar contact of said reset button. With this modified system superimposed on any of the embodiments above-described, it is only necessary to depress and release the reset button to effect a return to solenoid 21. In other words, the cycle will return to the pre-selected position (unless already there) each time the reset button is depressed and released. In order to effect return to any other solenoid it is only necessary to determine which contacts must be closed to effect the energization of such other solenoid. As for example (Fig. 2), solenoid 41 is energized when contact 43 is closed; contact 43 is closed when winding 42 is energized; and winding 42 is energized when contacts 85 and 94 are closed. Therefore if power is supplied through the reset button to windings 81 and 93, said contacts 85 and 94 will both be closed, resulting in energization of solenoid 41 whenever the reset button is depressed and released. It will therefore be apparent to anyone skilled in the art that a reset circuit could be provided for each solenoid in the circuit arrangement, thus providing the expedient of returning to any one of the work-performing solenoids merely upon depressing and releasing the appropriate reset button.

Although only several embodiments of the invention are shown and described herein, it will be understood that this application is intended to cover such other changes or modifications as come within the spirit of the invention or scope of the following claims:

I claim:

1. In an electrical control system for the sequential energization of individual principal circuits in forward and rearward stepping cycles comprising, a plurality of principal circuits adapted to operate power devices, standard non-latching relays for controlling said principal circuits, standard latching relays for controlling said non-latching relays and having unlatching coils, a limit switch for placing said latching relays across the line while keeping said unlatching coils off the line, and a second limit switch for placing said unlatching coils across the line while keeping said latching relays off the line, said non-latching relays having contacts in the circuits for said latching relays and said unlatching coils, and said latching relays having contacts in the circuits for said non-latching relays and said unlatching coils whereby upon enerigzation of one principal circuit another principal circuit is upon return to normal position placed in condition for energization upon reclosure of said first limit switch.

2. In an electrical control system, a plurality of principal circuits adapted to operate power devices, non-latching relays for controlling said circuits, latching relays for controlling said non-latching relays and having unlatching coils, first contacts operated by said non-latching relays and said latching relays to select a latching relay for subsequent energization, second contacts operated by said non-latching relays to energize a selected unlatching coil, and a limit switch for momentarily closing the circuit for the selected latching relays and opening the circuit for the unlatching coils.

3. In an electrical control system, a plurality of principal circuits adapted to operate power devices, non-latching relays for controlling said circuits, latching relays for controlling said non-latching relays and having unlatching coils, first contacts operated by said non-latching relays and said latching relays to select a latching relay for subsequent energization, second contacts operated by said non-latching relays to energize a selected unlatching coil, a limit switch for momentarily closing the circuit for the selected latching relays and opening the circuit for the unlatching coils, third contacts operated by said non-latching relays and said latching relays to select an unlatching coil for subsequent energization, fourth contacts operated by said non-latching relays to energize a selected latching relay, and a limit switch for momentarily closing the circuits for the selected unlatching coils and opening the circuit for the latching relays.

4. In an electrical control system for the sequential energization of individual principal circuits in forward and rearward stepping cycles comprising, a plurality of principal circuits adapted to operate power devices, standard non-latching relays for controlling said principal circuits, standard latching relays for controlling said non-latching relays and having unlatching coils, intermediate contacts operated by said relays whereby one non-latching relay is energized and two latching relays are locked to maintain one principal circuit closed, and a switch operable to closed and opened position for latching a third latching relay and unlatching one of said two latched relays whereby said one non-latching relay is deenergized and the next forward non-latching relay is energized.

5. In an electrical control system for the sequential energization of individual principal circuits in forward and rearward stepping cycles comprising, a plurality of principal circuits adapted to operate power devices, standard non-latching relays for controlling said principal circuits, standard latching relays for controlling said non-latching relays and having unlatching coils, intermediate contacts operated by said relays whereby one non-latching relay is energized and two latching relays are locked to maintain one principal circuit closed, and a switch operable to closed and open position for unlatching one of said latched relays and latching a third latching relay to deenergize said one non-latching relay and to energize the next rearward non-latching relay.

6. In an electrical control system for the sequential energization of individual principal circuits in forward and rearward stepping cycles comprising, a plurality of principal circuits adapted to operate power devices, standard non-latching relays for controlling said principal circuits, standard latching relays for controlling said non-latching relays and having unlatching coils, intermediate contacts operated by said relays whereby one non-latching relay is energized and two latching relays are locked to maintain one principal circuit closed, a first switch operable to closed and opened position for latching a third latching relay and unlatching one of said two latched relays whereby said one non-latching relay is deenergized and the next forward non-latching relay is energized, and a second switch operable to closed and open position for unlatching one of said latched relays and latching a third latching relay to deenergize said one non-latching relay and to energize the next rearward non-latching relay.

7. In an electrical control system for the sequential energization of individual principal circuits in forward and rearward stepping cycles comprising, a plurality of principal circuits adapted to operate power devices, non-latching and latching relays of standard design for controlling said principal circuits arranged so that: one latching relay is effective to energize one non-latching relay and deenergize another non-latching relay preceding said one in the sequence of operation; one non-latching relay and one unlatched latching relay are effective to place another latching relay in position to be energized by a first limit switch; and one non-latching relay and one latched latching relay are effective to place another latched latching relay in position to be unlatched by a second limit switch, a first limit switch to energize said first named another latching relay, and a second limit switch to unlatch said second named another latched latching relay.

8. In an electrical system having a plurality of circuits, means for controlling said circuits whereby a closed circuit may be deenergized and the next succeeding circuit energized each time a first limit switch is operated and a closed circuit may be deenergized and the next preceding open circuit energized each time a second limit switch is operated comprising a non-latching relay for controlling each circuit, a latching relay for each non-latching relay, said non-latching and latching relays functioning in pairs to control the energization of a non-latching relay, and said non-latching and latching relays functioning in different pairs to arrange the energization of a latching relay upon actuation of a first limit switch, said non-latching and latching relays functioning in still different pairs to arrange the unlatching of a latching relay upon actuation of a second limit switch, said non-latching relays acting alone to arrange the energization of a latching relay upon return to normal of a second limit switch and to arrange the unlatching of a latching relay upon return to normal of a first limit switch, a first limit switch adapted upon actuation to close the circuit arranged for a latching relay and upon return to normal to close the circuit arranged for unlatching a latched relay, and a second limit switch adapted upon actuation to close the circuit arranged for unlatching a latching relay and upon return to normal to close the circuit arranged for energization of a latching relay.

9. In an electrical control system for the sequential energization of individual principal circuits in forward and rearward stepping cycles comprising, a plurality of principal circuits adapted to operate power devices, standard non-latching relays for controlling said principal circuits, standard latching relays for controlling said non-latching relays and having unlatching coils, intermediate contacts operated by said relays whereby one non-latching relay is energized and two latching relays are locked to maintain one principal circuit closed, a switch operable to closed and opened position for latching a third latching relay and unlatching one of said two latched relays whereby said one non-latching relay is deenergized and the next forward non-latching relay is energized and associated means providing operation thereof for return to any desired position in the sequence.

10. In an electrical control system for the sequential energization of individual principal circuits in forward stepping cycles comprising, a plurality of principal circuits adapted to operate power devices, standard non-latching relays for controlling said principal circuits, standard latching relays for controlling said non-latching relays and having unlatching coils, intermediate contacts operated by said relays whereby one non-latching relay is energized and two latching relays are locked to maintain one principal circuit closed, a switch operable to closed and opened position for latching a third latching relay and unlatching one of said two latched relays whereby said one non-latching relay is deenergized and the next forward non-latching relay is energized and associated means providing operation thereof for return to any desired position in the sequence.

11. In an electrical control system for the sequential energization of individual principal circuits in forward and rearward stepping cycles comprising, a plurality of principal circuits adapted to operate power devices, standard non-latching relays for controlling said principal circuits, standard latching relays for controlling said non-latching relays and having unlatching coils, intermediate contacts operated by said relays whereby one non-latching relay is energized and two latching relays are locked to maintain one principal circuit closed, a switch operable to closed and open position for unlatching one of said latched relays and latching a third latching relay to deenergize said one non-latching relay and to energize the next rearward non-latching relay and associated means providing operation thereof for return to any desired position in the sequence.

12. In an electrical control system for the sequential energization of individual principal circuits in forward and rearward stepping cycles comprising, a plurality of principal circuits adapted to operate power devices, standard non-latching relays for controlling said principal circuits, standard latching relays for controlling said non-latching relays and having unlatching coils, intermediate contacts operated by said relays whereby one non-latching relay is energized and two latching relays are locked to maintain one principal circuit closed, a first switch operable to closed and opened position for latching a third latching relay and unlatching one of said two latched relays whereby said one non-latching relay is deenergized and the next forward non-latching relay is energized, a second switch operable to closed and open position for unlatching one of said latched relays and latching a third latching relay to deenergize said one non-latching relay and to energize the next rearward non-latching relay and associated means providing operation thereof for return to any desired position in the sequence.

ROBERT NELSON ECK.

No references cited.